(12) United States Patent
Glenn et al.

(10) Patent No.: US 6,424,315 B1
(45) Date of Patent: Jul. 23, 2002

(54) SEMICONDUCTOR CHIP HAVING A RADIO-FREQUENCY IDENTIFICATION TRANSCEIVER

(75) Inventors: Thomas P. Glenn, Gilbert; Steven Webster, Chandler, both of AZ (US)

(73) Assignee: Amkor Technology, Inc., Chandler, AZ (US)

( * ) Notice: Subject to any disclaimer, the term of this patent is extended or adjusted under 35 U.S.C. 154(b) by 0 days.

(21) Appl. No.: 09/631,449

(22) Filed: Aug. 2, 2000

(51) Int. Cl.$^7$ ................................................. H01Q 1/38
(52) U.S. Cl. ......................... 343/895; 340/572.7; 29/600
(58) Field of Search ................................. 343/895, 873; 29/600; 235/491; 340/572.7; 257/673, 679; H01Q 1/38

(56) References Cited

U.S. PATENT DOCUMENTS

| | | | | |
|---|---|---|---|---|
| 5,808,587 A | * | 9/1998 | Shima | 343/895 |
| 6,118,379 A | * | 9/2000 | Kodukula et al. | 343/895 |
| 6,147,662 A | * | 11/2000 | Grabau et al. | 343/895 |

FOREIGN PATENT DOCUMENTS

| WO | WO 001/13438 | 3/2000 | H04Q/7/20 |
|---|---|---|---|

OTHER PUBLICATIONS

Rebeiz, G., "Millimeter–Wave and Terahertz Integrated Circuit Antennas", Proceedings of the IEEE, vol. 80, No. 11, Nov. 1992, pp. 1748–1770.
Alexopoulos, N., "Substrate Optimization for Integrated Circuit Antennas," IEEE Transactions on Microwave Theory and Techniques, vol. MTT–31, No. 7, Jul. 1983, pp. 550–557.
Flynt et al., "Low Cost and Compact Active Integrated Antenna Transceiver for System Applications," IEEE Transactions on microwave Theory and Techniques, vol. 44, No. 10, Oct. 1996, pp. 1642–1649.

* cited by examiner

Primary Examiner—Michael C. Wimer

(57) ABSTRACT

A miniature radio-frequency identification (RFID) transceiver and a method for making the same are provided. The RFID transceiver is small in size and physically rugged. The RFID transceiver includes an integrated circuit and a radio-frequency antenna that is fixed to the integrated circuit and electrically connected to the integrated circuit. The integrated circuit includes an RFID transceiver circuit. The antenna may be a single thin-film layer over the top surface of the integrated circuit or multiple layers that form a larger antenna in a compact, folded structure. Multiple antenna layers may also be used to form a three-dimensional structure for improved antenna operation or may be used to form separate, independent antennas.

21 Claims, 6 Drawing Sheets

SEMICONDUCTOR CHIP HAVING A RADIO-FREQUENCY IDENTIFICATION TRANSCEIVER

BACKGROUND OF THE INVENTION

A radio-frequency identification (RFID) transceiver is a device that receives an electronic signal, generates a response signal, and then transmits the response signal. Uses for RFID transceivers include locating or identifying individual items within a large group, such as a single garment within a department store, a pet within a group, or an animal within a herd.

Some RFID transceivers include one or more antennae that are electrically connected to an accompanying electronic circuit. The electronic circuit portion of the RFID transceiver can be fabricated of discrete components on a printed circuit board or may be formed within an integrated circuit (i.e., a semiconductor chip). The antenna portion of the REID transceiver may be a three-dimensional structure such as a metal coil or may be a thin-film on a printed circuit board or other substrate.

One known RFID transceiver includes an electronic circuit and an antenna that are physically separate from each other, but that electrically communicate through capacitive or inductive coupling. Another RFID transceiver uses bond wires to electrically connect an integrated circuit to the antenna; the antenna and circuit are then encapsulated in a potting material, or in packaging such as a glass tube. Still another RFID transceiver uses no attendant circuitry but uses an antenna that resonates and retransmits at specific radio frequencies when stimulated by a radio signal.

SUMMARY OF THE INVENTION

The present invention provides a miniature radio-frequency identification (RFID) transceiver and a method for making the same.

One embodiment of an RFID transceiver within the present invention includes an integrated circuit that further includes at least an REID transceiver circuit. The REID transceiver also includes at least one radio-frequency antenna that is formed on the integrated circuit. The antenna and the integrated circuit are electrically connected.

The antenna may be made of one or more patterned, thin-film layers. Having multiple antenna layers can provide the benefit of a relatively large antenna in a compact, folded structure. Alternatively, having multiple antenna layers can provide multiple, independent antennas for use by the RFID transceiver. Implementation of the antenna on the integrated circuit provides an RFID transceiver that is small in size, physically rugged, and relatively inexpensive.

The forgoing and other objects, aspects, and advantages of the present invention will be better understood from the following drawings and the detailed description of various alternative embodiments of the present invention.

BRIEF DESCRIPTION OF THE DRAWINGS

FIG. 1b is an exploded top view of the RFID transceiver of FIG. 1a.

FIG. 3b is an exploded top view of the RFID transceiver of FIG. 3a.

FIG. 4b is an exploded top view of the RFID transceiver of FIG. 4a.

In the drawings, where the different embodiments have similar structures, the same reference numbers are usually used.

DETAILED DESCRIPTION OF THE INVENTION

Figure 1A:
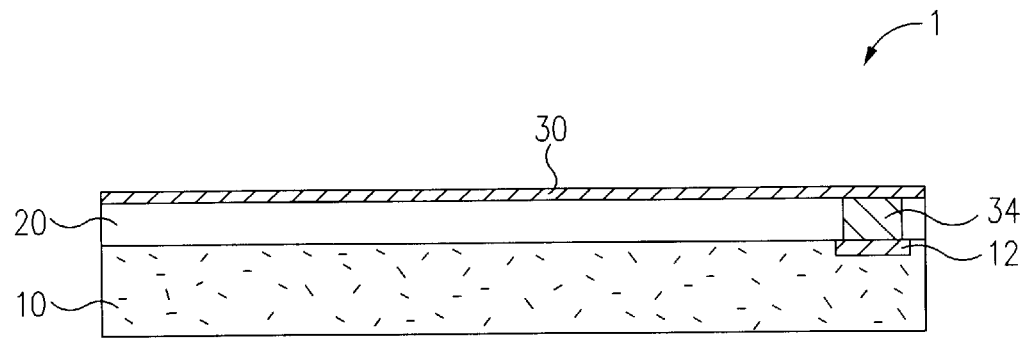
FIG. 1a depicts a cross-sectional side view of radio-frequency identification (RFID) transceiver 1.

FIG. 1a depicts a cross-sectional side view of radio-frequency identification (RFID) transceiver 1 in accordance with one embodiment of the present invention. RFID transceiver 1 includes integrated circuit 10. Integrated circuit 10 includes an RFID transceiver circuit and at least one contact area 12, and may include accompanying control or processing circuitry. Insulating layer 20 is superimposed over the top surface of integrated circuit 10, and antenna layer 30 is superimposed over the top surface of insulating layer 20.

Insulating layer 20 provides electrical insulation between integrated circuit 10 and antenna layer 30. Electrical conductor 34 electrically connects contact area 12 of integrated circuit 10 to antenna layer 30, through insulating layer 20.

Contact area 12 may be, for example, a metal input/output pad, a semiconductor area, or any other desired part of integrated circuit 10. Contact area 12 provides either direct electrical connection to the RFID transceiver circuit or indirect electrical connection to the RFID transceiver circuit through an intervening connection to accompanying processing or control circuitry. The term "electrically connects" and variations thereof are used broadly herein to mean providing an electrically conductive path between the "electrically connected" structures, which may be due to a direct or indirect physical connection.

Figure 1B:
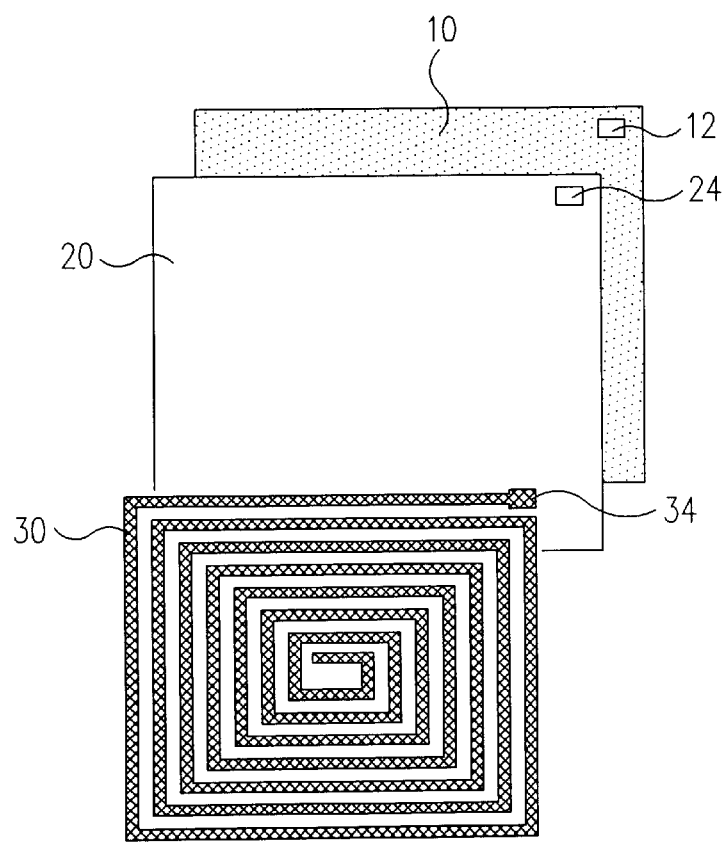

FIG. 1b is an exploded top view of RFID transceiver 1, wherein integrated circuit 10, insulating layer 20, and antenna layer 30 are separated for illustration. Insulating layer 20 contains at least one contact via 24 through which electrical conductor 34 extends so as to electrically connect integrated circuit 10 to antenna layer 30. Antenna layer 30 follows a pattern that conforms to a desired antenna design. FIG. 1b is an exemplary embodiment in which antenna layer 30 has a spiral pattern.

Antenna layer 30 acts as a radio-frequency antenna and receives an electrical stimulus signal that has been radio-transmitted to RFID transceiver 1 from external polling equipment. Typically, in an RFID application, an electrical stimulus signal is a radio-frequency tone (electronic sinewave-shaped signals having specific frequencies) or a simple modulation thereof. Antenna layer 30 passes the electrical stimulus signal to integrated circuit 10. Integrated circuit 10 generates a desired electrical response signal, and passes the electrical response signal back to antenna layer 30. Antenna layer 30 then radio-transmits the generated electrical response signal. Typically, in an RFID application an electrical response signal is a radio-frequency tone or a simple modulations thereof. A specific response signal indicates a particular RFID transceiver and thereby implicitly identifies the individual item, such as a piece of clothing or an individual animal, into which the particular RFID transceiver is installed. More complex stimulus and response signals may be used for more demanding applications, such as identification of individuals or equipment for military uses.

Figure 2:
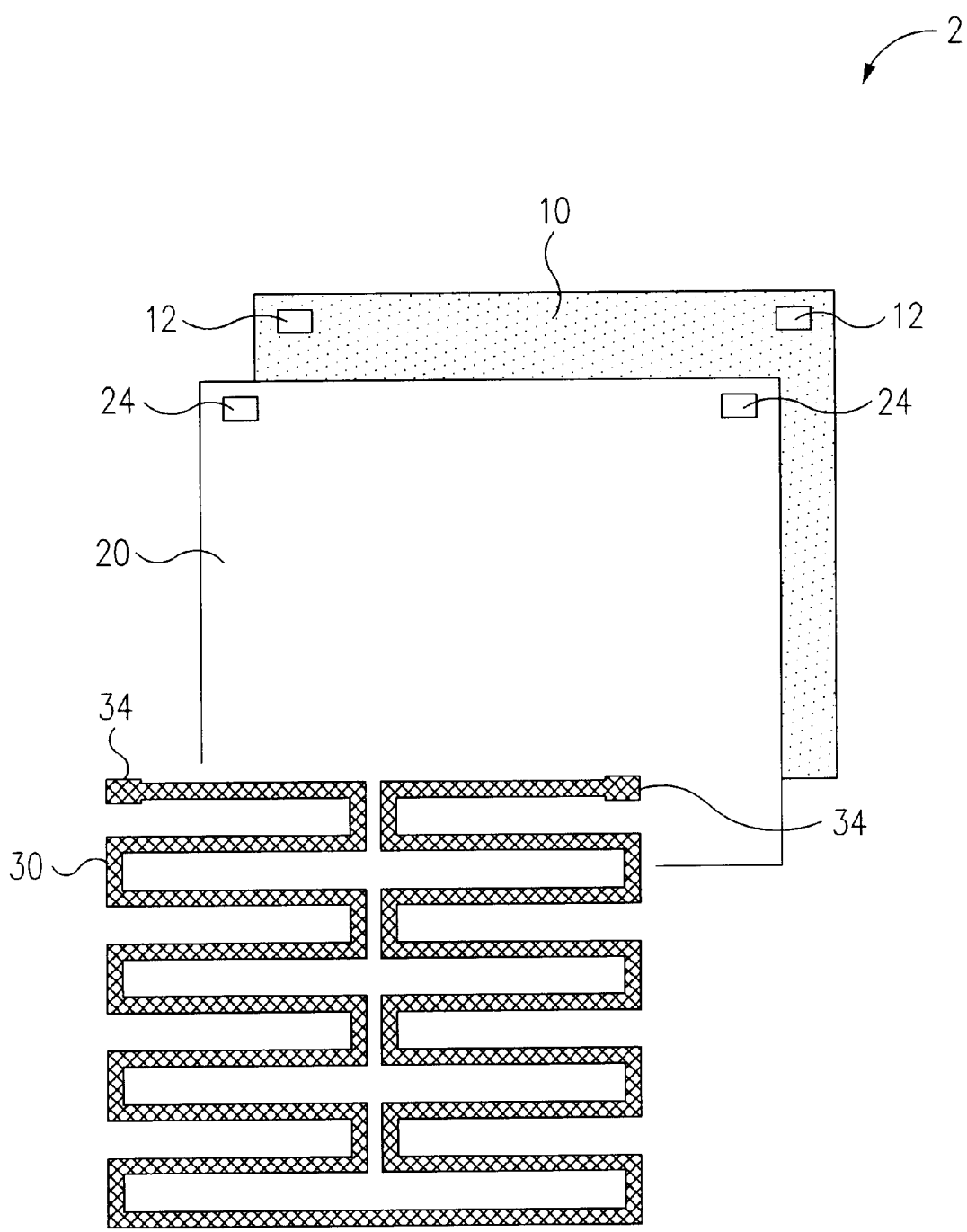
FIG. 2 is an exploded top view of an alternative RFID transceiver.

FIG. 2 is an exploded top view of an alternative embodiment of an RFID transceiver 2 within the present invention. Integrated circuit 10, insulating layer 20, and antenna layer 30 of RFID transceiver 2 are similar to those of RFID transceiver 1 of FIGS. 1a, 1b, except that RFID transceiver 2 of FIG. 2 has two contact vias 24 extending through insulating layer 20. An electrical conductor 34 extends through each of the contact vias 24 and respectively provides electrical connection between integrated circuit 10 and antenna layer 30. In this embodiment, the pattern of antenna layer 30 is serpentine, and the respective ends of antenna layer 30 are electrically connected to a different contact area 12 of integrated circuit 10.

Thus, antenna layer 30 and integrated circuit 10 can be electrically connected at a single point, as in RFID transceiver 1 of FIGS. 1a, 1b, or at multiple points, as in RFID transceiver 2 of FIG. 2. Exemplary of possible embodiments of the present invention, the design of antenna layer 30 may, among other possibilities, form either: (1) a single, physically continuous antenna, (2) multiple, separate antenna elements that work in concert, (3) multiple separate antennas that work independently, or (4) a part of a larger, multiple-layer antenna. The electrical operation of antenna layer 30 will depend on the layer design, the location of electrical connection with integrated circuit 10 and the operation of integrated circuit 10.

Figure 3A:
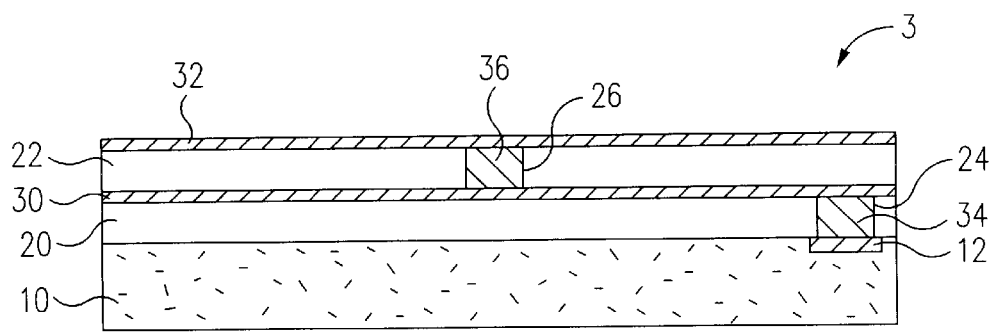
FIG. 3a depicts a cross-sectional side view of a further alternative RFID transceiver having multiple antenna layers that are directly, electronically connected to each other.

FIG. 3a depicts a cross-sectional side view of another alternative embodiment of an RFID transceiver 3 within the present invention. RFID transceiver 3 includes an integrated circuit 10, first insulating layer 20, and first antenna layer 30 similar to those of RFID transceiver 1 of FIG. 1a. However, RFID transceiver 3 also includes a second insulating layer 22 over first antenna layer 30, and a second antenna layer 32 over second insulating layer 22. Antenna layers 30 and 32 are electrically connected, thereby forming a two-layer antenna that is approximately twice as long as the single-layer antennas of RFID transceivers 1 and 2 of FIGS. 1a, 1b and 2.

Figure 3B:
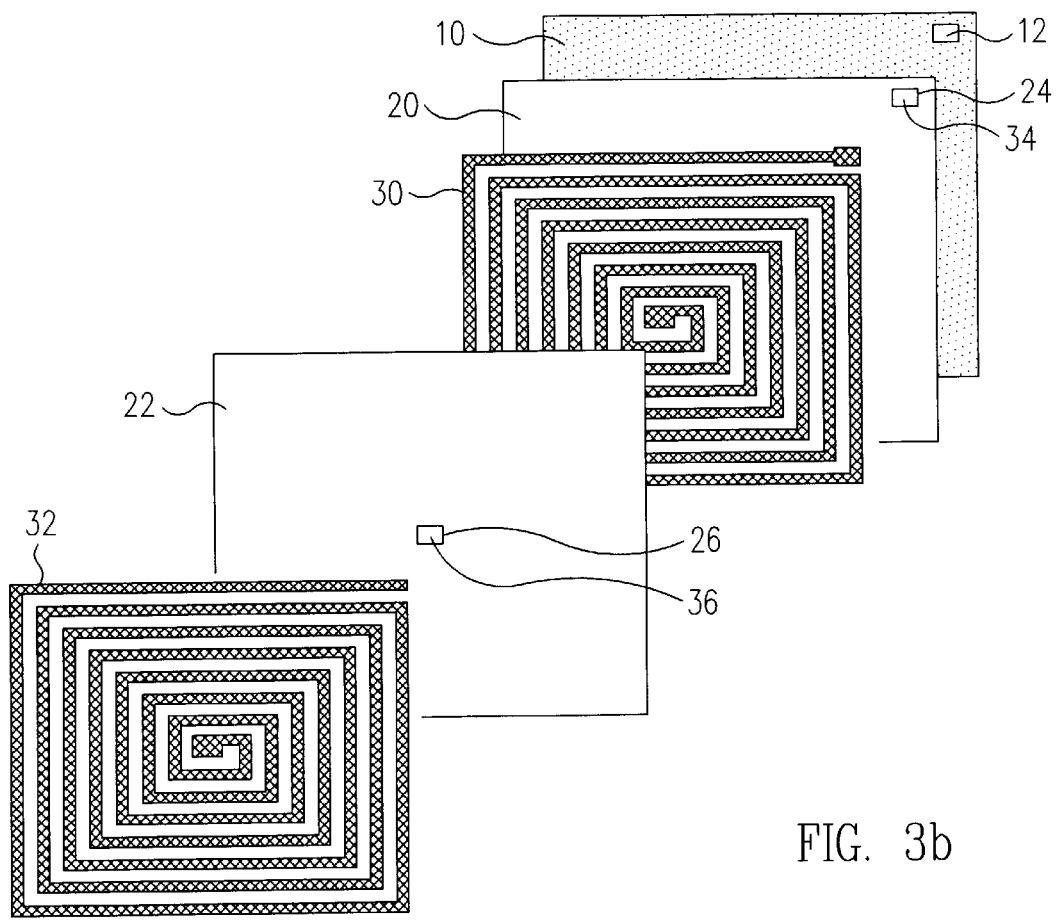

FIG. 3b provides an exploded top view of RFID transceiver 3 of FIG. 3a with the layers separated for illustration. As in RFID transceiver 1 of FIG. 1a, 1b, a first contact via 24 extends through first insulating layer 20. A first electrical conductor 34 extends through contact via 24 and provides electrical connection between integrated circuit 10 and first antenna layer 30. However, in FIGS. 3a, 3b, a second contact via 26 extends through second insulating layer 22. Second electrical conductor 36 extends through second contact via 26 and provides electrical connection between second antenna layer 32 and first antenna layer 30. Second electrical conductor 36 increases the length of the antenna of RFID transceiver 3 by adding the length of second antenna layer 32 to that of first antenna layer 30. Thus, the present invention allows the use of multiple antenna layers, such as are found in FIGS. 3a, 3b, to produce a final antenna of a desired length and design that will have a desired electrical resonance or operation at a desired radio-frequency.

Figure 4A:
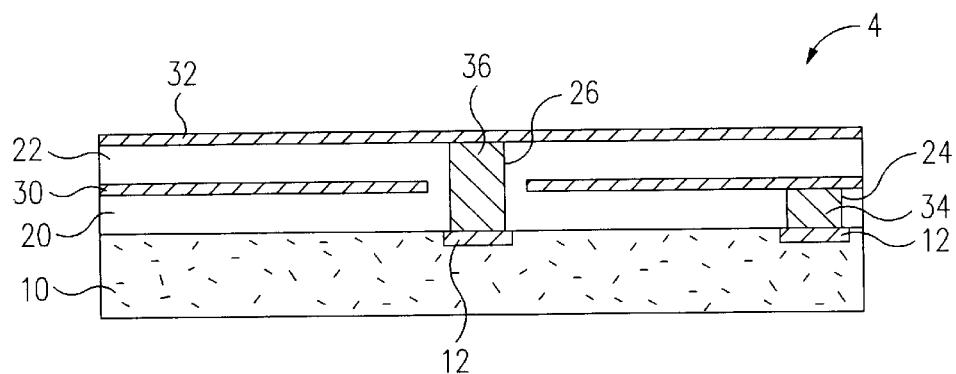
FIG. 4a depicts a cross-sectional side view of an alternative RFID transceiver having multiple antenna layers that are not directly, electronically connected to each other.

FIG. 4a depicts a cross-sectional side view of a further alternative embodiment of an RFID transceiver 4 in accordance with the present invention. RFID transceiver 4 of FIG. 4a includes an integrated circuit 10, first and second insulating layers 20 and 22, and first and second antenna layers 30 and 32, similar to those seen in FIGS. 3a, 3b.

Figure 4B:
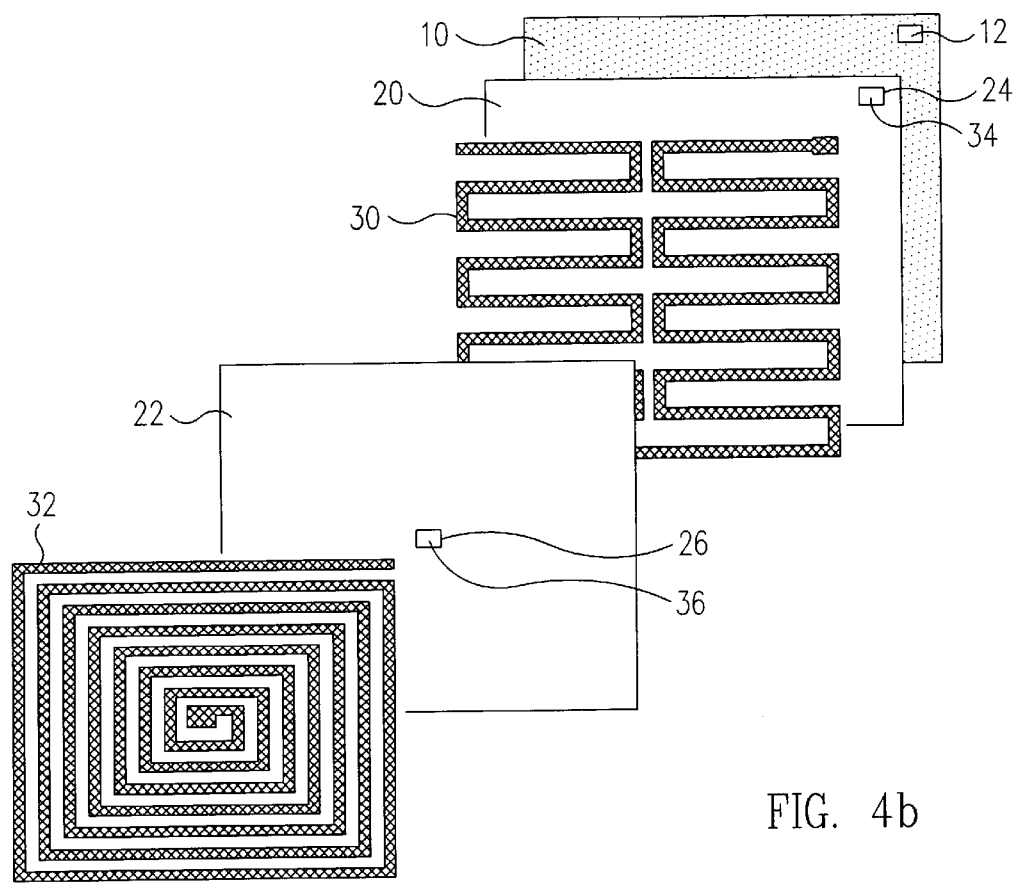

FIG. 4b is an exploded top view of RFID transceiver 4. As in RFID transceiver 3 of FIGS. 3a, 3b, a first contact via 24 and a first electrical conductor 34 extend through first insulating layer 20 and provide electrical connection between first antenna layer 30 and first contact area 12 of integrated circuit 10.

However in FIGS. 4a, 4b, a second contact via 26 and a second electrical conductor 36 extend through second insulating layer 22, first antenna layer 30, and first insulating layer 20. Second electrical conductor 36 provides electrical connection between second antenna layer 32 and a second contact area 12 of integrated circuit 10, without a direct electrical connection to first antenna layer 30. This allows antenna layers 30 and 32 to be used, for example, as separate antenna structures, as seen in FIG. 4b. Exemplary uses for the separate antennas of RFID transceiver 4 are to respond to two different stimulus signals or to transmit two different electrical response signals. As an alternative example (not shown), antenna layer 30 may be designed as a shielding layer held at a reference voltage (e.g., ground voltage) that electrically isolates second antenna layer 32 from the circuitry below.

Figure 5:
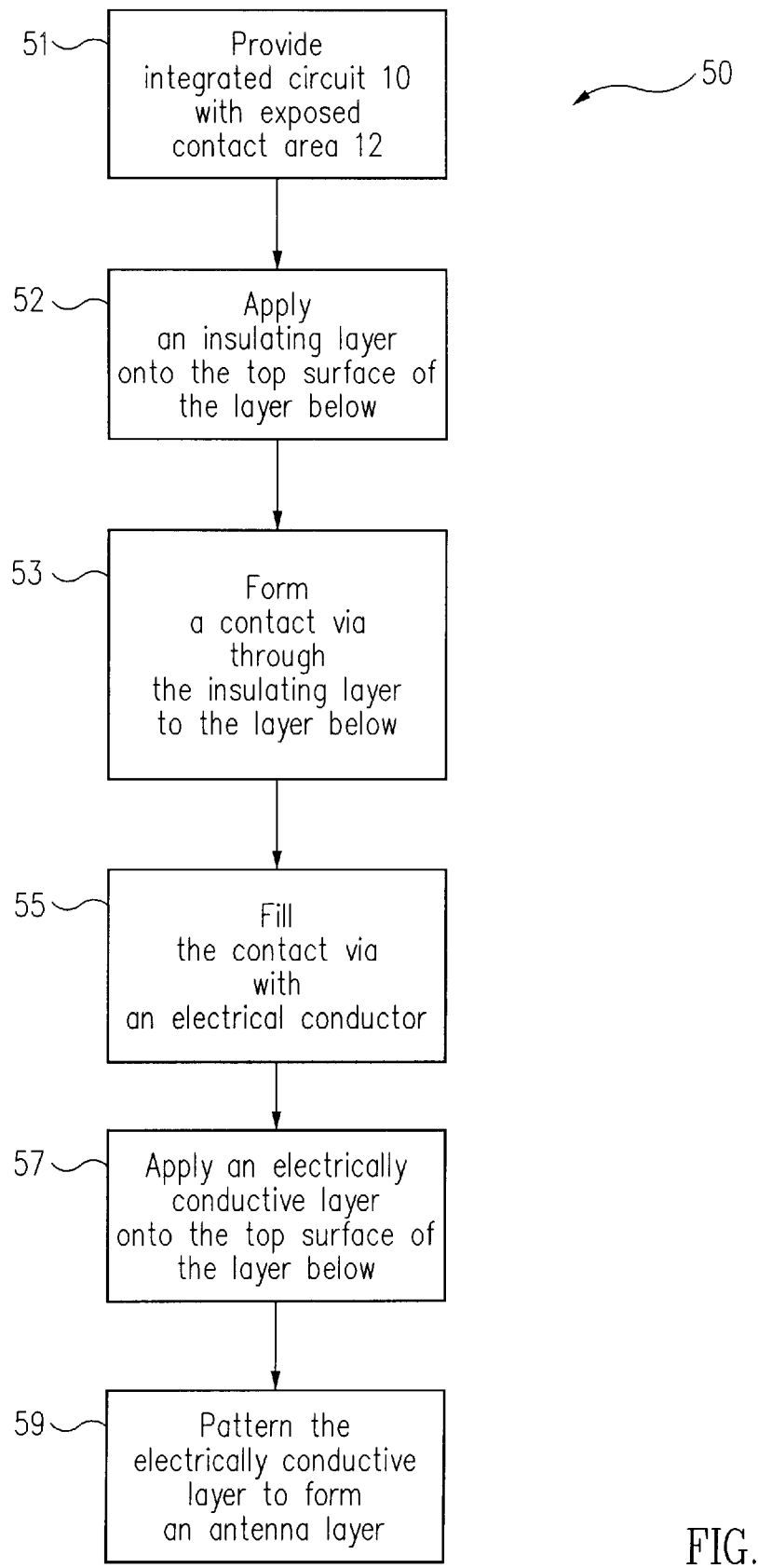
FIG. 5 is a flow chart of an exemplary method 50 of making an RFID transceiver.

FIG. 5 is a flow chart of an exemplary method 50 of making an RFID transceiver in accordance with the present invention. For the sake of example, assume that method 50 is used to make RFID transceiver 1 of FIGS. 1a, 1b. The order of the steps may vary.

In step 51, an integrated circuit 10 is provided that includes an RFID transceiver circuit. The active, top surface of integrated circuit 10 includes an exposed, contact area 12 with a top surface that serves as an input/output connector for creating electrical contact with integrated circuit 10.

In step 52, a first insulating layer 20 is applied onto the top surface of integrated circuit 10. First insulating layer 20 may be formed of any insulating material that is compatible with a semiconductor chip, such as spin-on glass, polyimide, $SiO_2$, or silicon nitride. This material may be spun-on, deposited, or grown using any convenient method, such as those commonly used in semiconductor chip manufacture or packaging. Typically, insulating layer 20 will be applied over the entire top surface of integrated circuit 10, including over contact area 12. Alternatively, insulating layer 20 may be applied around and not covering contact area 12, obviating the need for step 53 which is discussed below.

In step 53, assuming that contact area 12 is covered by insulating layer 20, a first contact via 24 is formed through first insulating layer 20 so as to expose contact area 12 of integrated circuit 10. First contact via 24 can be formed using any convenient method, such as photo-lithography including etching, e-beam lithography including etching, or contact molding.

In step 55, first contact via 24 is filled with an electrically conductive material so as to form electrical conductor 34. Conductor 34 makes electrical connection to the exposed surface of contact area 12. The material used to fill first contact via 24 can be any electrically conductive material, such as metal, doped semiconductor, doped polymer, metal-filled epoxy, or electrically conductive ink. The material of electrical conductor 34 may be applied by a variety of convenient methods, such as chemical vapor deposition, sputtering, plating, screening, and spin-on, among other possibilities.

In step 57, an electrically conductive layer is formed onto the top surface of first insulating layer 20. The electrically conductive layer may be made of any electrically conductive material, such as metal, doped semiconductor, doped polymer, metal-filled epoxy, or electrically conductive ink. The material of the electrically conductive layer may be applied by a variety of convenient methods, such as chemical vapor deposition, sputtering, plating, screening, and spin-on, among other possibilities. In addition to being applied onto the top surface of first insulating layer 20, the electrically conductive layer is also applied onto the exposed top surface of electrical conductor 34, thereby forming an electrical connection between contact area 12 and the electrically conductive layer through electrical conductor 34. Steps 55 and 57 may be done simultaneously by having the material of the conductive layer also fill first contact via 24.

In step 59, the electrically conductive layer is patterned to form a first antenna layer 30. Patterning may be done using any convenient method, such as photo-lithography including etching, e-beam lithography including etching, or contact molding.

Alternatively, after step 55, a patterned antenna layer 30 may be applied directly onto the first insulating layer 20 through contact printing, screening, or any other method for transferring a pattern of material onto a surface. As another alternative, a pre-patterned conductive antenna layer 30, for example, a patterned metal foil, may be attached onto the top surface of insulating layer 20 and over electrical conductor 34.

Artisans will appreciate that method 50 may be modified to form the other exemplary embodiments discussed herein.

Figure 6:
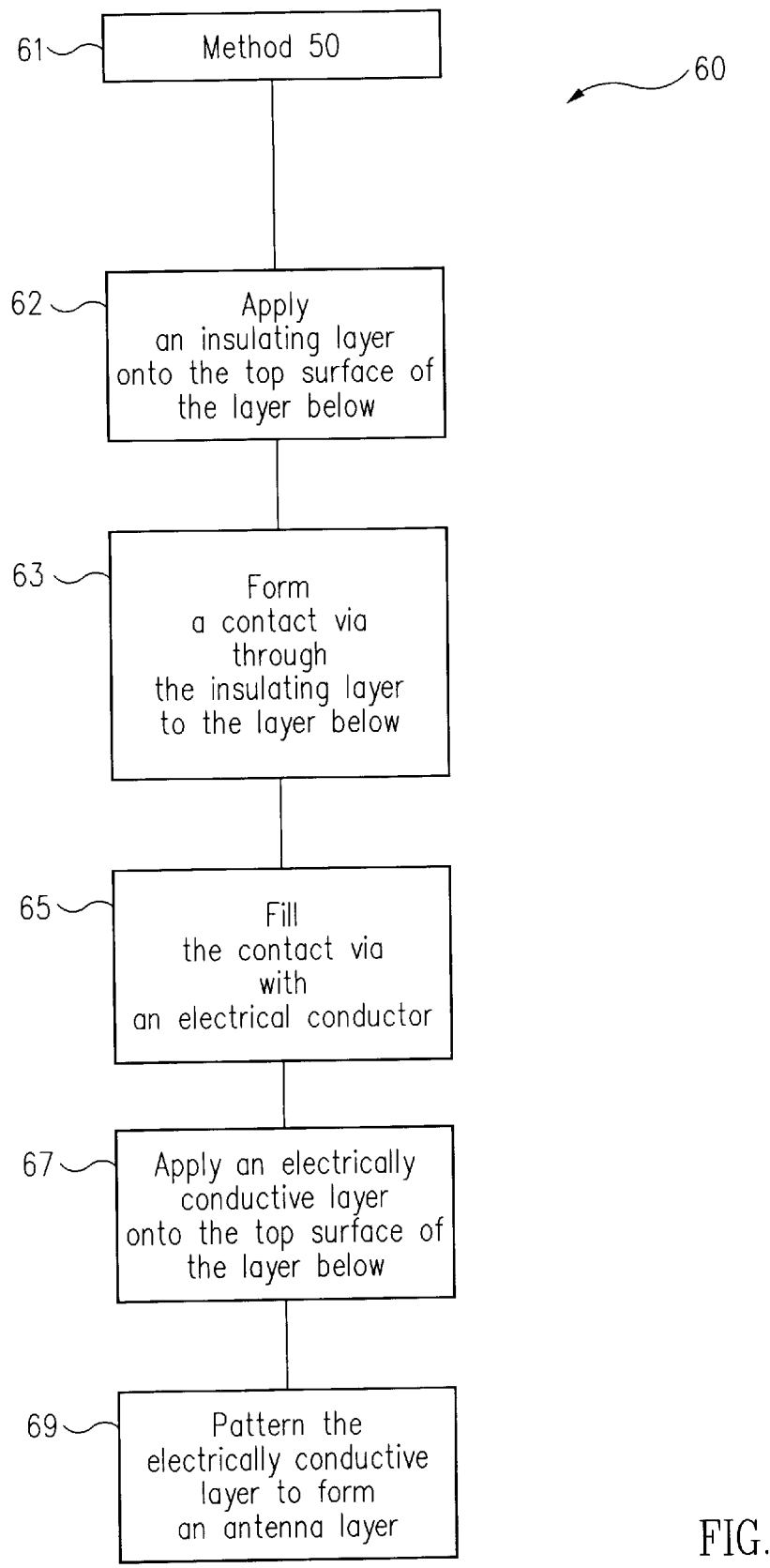
FIG. 6 is a flow chart of an exemplary method 60 of making an alternative RFID transceiver.

FIG. 6 is a flow chart of an exemplary method 60 of making an alternative RFID transceiver in accordance with the present invention. For the sake of example, assume that method 60 is used to make RFID transceiver 3 of FIGS. 3a, 3b. Steps 51 through 59 are followed as in method 50. Then steps 52 through 59 of method 50 are repeated, as steps 62 through 69, to form a second insulating layer 22 and a second antenna layer 32 onto the top surface of first antenna layer 30. Also, a second contact via 26 and a second electrical conductor 36 are formed through second insulating layer 22 so as to electrically connect second antenna layer 32 to first antenna layer 30. As an option, the location of second electrical conductor 36 can be chosen so that it is not directly over first electrical conductor 34. Staggering the locations of electrical conductors 34 and 36 can improve the planarity of the RFID transceiver.

As an alternative example, method 60 may be used to make RFID transceiver 4 of FIGS. 4a, 4b. However, second contact via 26 and second electrical conductor 36 are formed in steps 63 and 65 respectively to extend through second insulating layer 22, first antenna layer 30, and first insulating layer 20. Second electrical conductor 36 electrically connects second antenna layer 32 and a second contact area 12 of integrated circuit 10, without directly electrically connecting to first antenna layer 30. This allows antenna layers 30 and 32 to be used, for example, as separate antenna structures, as seen in FIG. 4b.

The embodiments of the RFID transceiver and assembly methods described above are merely examples of the present invention. Those skilled in the art will appreciate that variations are possible within the scope of the claims set forth below.

What is claimed is:

1. A miniature radio-frequency identification (RFID) transceiver, comprising:
   an integrated circuit including an RFID transceiver circuit and a first contact area on a top surface of the integrated circuit, said contact area being in electrical communication with the RFID transceiver circuit;
   a first electrically insulating layer deposited over said top surface of the integrated circuit, said first electrically insulating layer including a hole exposing said first contact area;
   a first antenna layer formed on said first insulating layer, said first insulating layer providing electrical insulation between said top surface of said integrated circuit and said first antenna layer, said first antenna layer including a patterned layer of an electrically conductive material, wherein the electrically conductive material integrally fills said hole and makes electrical contact with said first contact area.

2. The RFID transceiver of claim 1, including:
   a second electrically insulating layer deposited over said first antenna layer, said second electrically insulating layer including a first hole exposing a portion of the first antenna layer;
   a second antenna layer formed over said second insulating layer, said second insulating layer providing electrical insulation between said first antenna layer and said second antenna layer, said second antenna layer including a patterned layer of a first electrically conductive material, said first electrically conductive material integrally filling said first hole and making electrical contact with the first antenna layer.

3. The RFID transceiver of claim 1, including:
   a second contact area at said top surface of said integrated circuit;
   a second electrically insulating layer provided over said first antenna layer, said first and second electrically insulating layers including a first hole through them exposing a portion of the second contact area;
   a second antenna layer provided over said second insulating layer, said second insulating layer providing electrical insulation between said first antenna layer and said second antenna layer, said second antenna layer including a patterned layer of a first electrically conductive material, said first electrically conductive material integrally filling said first hole and making electrical contact with the second contact area.

4. The RFID transceiver of claim 1, wherein the electrically conductive material of the first antenna layer is metal.

5. The RFID transceiver of claim 1, wherein the electrically conductive material of the first antenna layer is selected from the group of electrically conductive ink and metal-filled epoxy.

6. The RFID transceiver of claim 2, wherein the electrically conductive material of at least one of the first and second antenna layers is metal.

7. The RFID transceiver of claim 2, wherein the electrically conductive material of at least one of the first and second antenna layers is selected from the group of electrically conductive ink and metal-filled epoxy.

8. The RFID transceiver of claim 2, wherein the first and second electrical conductors are transversely staggered.

9. The RFID transceiver of claim 1, wherein the first antenna layer has a spiral pattern.

10. A method for producing a miniature radio-frequency identification (RFID) transceiver, the method comprising:
    providing an integrated circuit having a top surface, an internal RFID transceiver circuit and a first contact area at said top surface and in electrical communication with the RFID transceiver circuit;
    depositing a first electrically insulating layer over the top surface of said integrated circuit;

forming a first hole through the first electrically insulating layer to expose the first contact area;

forming a patterned, electrically conductive first antenna layer of a first electrically conductive material over said first electrically insulating layer, said first electrically conductive material integrally filling said first hole and forming an electrical contact with the first contact area.

11. The method of claim 10, wherein forming a patterned first antenna layer includes screening the first electrically conductive material, in a pattern, over said first electrically insulating layer.

12. The method of claim 10, wherein providing a forming first antenna layer includes patterning the first electrically conductive material by at least one of etching or laser ablation.

13. The method of claim 10, wherein the first electrically conductive material of the first antenna layer is metal.

14. The method of claim 10, wherein the first electrically conductive material of the first antenna layer is selected from the group of electrically conductive ink and a metal-filled epoxy.

15. The method of claim 10, wherein forming a first electrical connection between said first antenna layer and said first contact area includes:

forming a first contact via through said first insulating layer; and filling said first contact via with an electrically conductive material.

16. The method of claim 15, wherein filling said first contact via and providing a patterned electrically conductive first antenna layer over said first electrically insulating layer are performed in a single step.

17. The method of claim 10, further comprising:

depositing a second electrically insulating layer over said first antenna layer;

forming a second hole through the second electrically insulating layer;

providing a patterned electrically conductive second antenna layer formed of a second electrically conductive material over said second electrically insulating layer, said second electrically conductive material integrally filling said second hole and making an electrical contact with at least one of said first antenna layer and said first contact area.

18. The method of claim 17, wherein at least one of said first and second electrically conductive materials is metal.

19. The method of claim 17, wherein at least one of said first and second electrically conductive materials is selected from the group of electrically conductive ink and a metal-filled epoxy.

20. The method of claim 17, wherein providing a patterned second antenna layer includes patterning the second electrically conductive material by at least one of etching or laser ablation.

21. The method of claim 17, wherein said first and second holes are provided at transversely staggered locations.

* * * * *

UNITED STATES PATENT AND TRADEMARK OFFICE
CERTIFICATE OF CORRECTION

PATENT NO.    : 6,424,315 B1
DATED         : July 23, 2002
INVENTOR(S)   : Thomas P. Glenn et al.

It is certified that error appears in the above-identified patent and that said Letters Patent is hereby corrected as shown below:

<u>Column 1,</u>
Line 19, delete "REID" and insert -- RFID --; and
Line 40, delete "REID" (both places) and insert -- RFID --.

Signed and Sealed this

Eighteenth Day of March, 2003

JAMES E. ROGAN
*Director of the United States Patent and Trademark Office*